United States Patent [19]

Evans

[11] Patent Number: 5,476,682

[45] Date of Patent: Dec. 19, 1995

[54] ANTIFOGGING PLASTIC LENS MATERIAL

[75] Inventor: Joseph H. Evans, Matthews, N.C.

[73] Assignee: Rexam Industries Corp., Matthews, N.C.

[21] Appl. No.: 161,929

[22] Filed: Dec. 3, 1993

Related U.S. Application Data

[62] Division of Ser. No. 993,310, Dec. 18, 1992, Pat. No. 5,324,573.

[51] Int. Cl.$^6$ ..................................................... B05D 5/06
[52] U.S. Cl. ................... 427/164; 427/248.1; 427/392.5; 427/412.5; 427/420; 427/428
[58] Field of Search .................................... 427/164, 412.5, 427/420, 428, 248.1, 393.5

[56] References Cited

U.S. PATENT DOCUMENTS

| | | |
|---|---|---|
| 2,698,240 | 12/1954 | Alles et al. . |
| 2,779,684 | 1/1957 | Alles . |
| 2,803,552 | 8/1957 | Stedman ..................................... 106/13 |
| 2,852,378 | 9/1958 | Nadeau et al. . |
| 2,943,937 | 7/1960 | Nadeau et al. . |
| 3,022,178 | 2/1962 | Park et al. . |
| 3,048,266 | 8/1962 | Hackhel et al. . |
| 3,071,466 | 1/1963 | Klockgether et al. . |
| 3,143,421 | 8/1964 | Nadeau et al. . |
| 3,271,178 | 9/1966 | Nadeau et al. . |
| 3,303,049 | 2/1967 | Hill . |
| 3,392,133 | 7/1968 | Stickelmeyer . |
| 3,502,501 | 3/1970 | Burczyk et al. . |
| 3,600,208 | 8/1971 | Abbott et al. . |
| 3,700,487 | 10/1972 | Crandon et al. . |
| 3,726,703 | 4/1973 | Dornte . |
| 3,929,699 | 12/1975 | Bernholz . |
| 3,950,289 | 4/1976 | D'Amato et al. . |
| 4,064,308 | 12/1977 | Laurin ...................................... 428/410 |
| 4,225,652 | 9/1980 | Mercer et al. ........................... 428/515 |
| 4,379,804 | 4/1983 | Eisele et al. ............................ 428/332 |
| 4,467,073 | 8/1984 | Creasy ..................................... 525/127 |
| 4,615,738 | 10/1986 | Sanders, Jr. et al. ...................... 106/13 |
| 4,927,668 | 5/1990 | Senckowski ............................. 427/168 |
| 4,950,706 | 8/1990 | Kurasawa ................................ 524/415 |
| 5,061,611 | 10/1991 | Sakata et al. ............................ 427/377 |
| 5,134,021 | 7/1992 | Hosono et al. .......................... 428/213 |

FOREIGN PATENT DOCUMENTS

| | | |
|---|---|---|
| 0051405 | 5/1982 | European Pat. Off. . |
| 85-214221 | 7/1985 | European Pat. Off. . |
| 0410798A2 | 1/1991 | European Pat. Off. . |
| 2253623 | 12/1974 | France . |

OTHER PUBLICATIONS

Kenneth M. Smith, *The Dimensional Stability of Polyester Photographic Films*, 1979 (9 pages) (no mo.).

Primary Examiner—Janyce Bell
Attorney, Agent, or Firm—Bell, Seltzer, Park & Gibson

[57] ABSTRACT

An antifogging plastic material is disclosed that is particularly suitable for use as a disposable fog-resistant lens. The lens material comprises a substantially transparent polyester substrate; a layer of polyvinylidene chloride-containing polymer on the polyester substrate; a water permeable colloid layer on the polyvinylidene chloride-containing layer; and a polyvinyl alcohol-containing layer on the water permeable colloid layer.

8 Claims, 1 Drawing Sheet

ANTIFOGGING PLASTIC LENS MATERIAL

This application is a division of Ser. No. 07/993,310 filed Dec. 18, 1992, now U.S. Pat. No. 5,324,573.

FIELD OF THE INVENTION

The present invention relates to antifogging techniques and in particular relates to a method of coating polyester film to give it antifogging properties, and a resulting antifogging lens material.

BACKGROUND OF THE INVENTION

Protective face coverings, including lens-containing structures such as masks and goggles that cover the eyes while still providing appropriate visual acuity, are used in a number of applications. These include eye protection in manufacturing or industrial circumstances, laboratories, educational activities, home and garden tasks, and in medical applications such as surgery.

With respect to medical applications, the eyes provide one of the main available entry points into the human body for viruses, microbes and other organisms. Thus, in medical practices such as surgery, where exposure to blood and other bodily fluids of a patient are expected, eye protection represents more than protection against loss of vision, and specifically provides a barrier against entry of potentially serious or even fatal diseases. For example, the increase in Acquired Immune Deficiency Syndrome (AIDS) in the population as a whole, and the present lack of a known cure, has increased the risk that infected patients or their blood will transmit the virus to exposed medical personnel through their eyes.

From a medical perspective, one desirable characteristic of an appropriate face mask, goggle, or other lens is that it be easily used in a sanitary condition. The simplest method of maintaining a goggle or a mask in a sanitary condition is to manufacture it under sterile conditions, use it once and then dispose of it. Accordingly, desirable masks and goggles should be manufactured from materials for which the cost is low enough to make disposal practical. One such material is polyester. When properly manufactured using known techniques and equipment, polyester is transparent, rigid enough to form an appropriate shape, optically clear, and flexible enough to be formed into light weight, comfortable masks, goggles and similar lens structures. Furthermore, as evidenced by its wide use in disposal food packaging, polyester is a relatively low cost material. It can also be conveniently recycled. Thus, goggles or masks formed from polyester can provide appropriate protection at low enough cost to be considered disposable.

One problem that arises with lens-containing devices, however, is the problem of fogging. In general, fogging occurs on a surface when the temperature of that surface falls below the dew point of the surrounding ambient air. With respect to lenses, fogging tends to occur because of the proximity of the surface of the lens portion of a goggle or a mask to the head and eyes of the wearer. As the wearer perspires or warms the air between the eyes and the lens (and even if not visibly so), moisture present between the lens and the wearer has a tendency to condense on the interior surface of the lens. If the lens material is hydrophobic, the condensed moisture will fail to wet the surface, and instead will form small droplets. Observed cumulatively, these droplets diffract light sufficiently to interfere with or even block the vision of the wearer. Thus, fogging is most desirably avoided where delicate work requires high visual acuity, such as during medical procedures, some of which are carried out at relatively low temperatures for medical reasons. For example, some surgical procedures are carried out at ambient temperatures as low as 50° F. in order to help slow a patient's metabolism.

Polyester, although favorable in a number of qualities discussed above, is nevertheless one such hydrophobic material and is thus subject to fogging. Accordingly, in order for polyester to be useful as a lens material in medical and other such applications, some technique must be used to minimize or eliminate fogging.

A typical method of attempting to avoid or eliminate fogging is to add some sort of hydrophilic coating to a hydrophobic substrate. When moisture condenses on a hydrophilic surface, it tends to wet the surface rather than form drops. As a result, the wetted surface is often transparent enough to prevent vision through the lens from being impaired.

In other techniques hydrophobic antifogging coatings have been applied to lenses in an attempt to cause water vapor to avoid contact entirely with the lens. Unfortunately, such techniques tend to have a net effect of instead allowing large water droplets to form, which is as undesirable as the fogging.

Even the hydrophilic coatings, however, include certain problems. Typically many exhibit poor optical clarity, cracking, streaking or haziness, opalescence, adhere poorly to substrates, have an oily surface, and are difficult to apply in a uniform coat.

A number of other techniques include the use of silicon compounds as antifogging agents, but such techniques bring their own set of problems are relatively expensive for a disposable article. Other compounds are insoluble in appropriate coating solvents and thus raise application difficulties.

One potentially favorable hydrophilic coating is polyvinyl alcohol (PVOH). As known to those familiar with this compound, polyvinyl alcohol is produced by the polymerization of vinyl acetate, followed by hydrolysis to form alcohol functional groups.

Polyvinyl alcohol, however, generally will not adhere to common lens substrate materials such as polyester, polycarbonate, acrylic, or cellulosic films. This lack of adhesion has limited the use of polyvinyl alcohol and the advantages it otherwise offers.

Accordingly, many modifications have been attempted in order to increase the affinity of polyvinyl alcohol for a substrate such as polyester. For example, some techniques add other functional groups to the backbone of the polymer in an effort to increase the affinity to the substrate. As the chemical nature of the polyvinyl alcohol is modified, however, the hydrophilic nature is also modified and its effectiveness as an antifogging material is minimized or destroyed.

Other techniques attempt to add wetting or surface active agents to the polyvinyl alcohol, but these materials are only effective When they bloom to the surface of the polyester and in doing so, exhibit an oily condition which in turn creates optical problems. Typically a lens material containing such surfactants creates a mottled appearance which is generally unacceptable.

Other methods of preparing the substrate have similarly failed to provide desired results, with such techniques including corona discharge treatment of the substrate, or of the coatings and primers. Such techniques have generally lacked success, however, usually because of poor adhesion to the substrate, poor optical properties or both.

OBJECT AND SUMMARY OF THE INVENTION

Therefore, there exists the need for a lens material for protective goggles, masks or glasses that can be formed from an inexpensive material such as polyester, and that can be coated with an inexpensive antifogging material such as polyvinyl alcohol and yet while exhibiting the necessary adhesion between the polyvinyl alcohol and the polyester while maintaining the required visual acuity and physical stability for use in demanding circumstances.

The present invention meets this object by providing an antifogging plastic film structure formed of a polyester substrate, a layer of a polyvinylidene chloride-containing polymer on the polyester substrate, a water permeable colloid layer on the polyvinylidene chloride-containing layer, and a polyvinyl alcohol-containing layer on the water permeable colloid layer.

The foregoing and other objects, advantages and features of the invention, and the manner in which the same are accomplished, will become more readily apparent upon consideration of the following detailed description of the invention taken in conjunction with the accompanying drawing, which illustrates a preferred and exemplary embodiment, and wherein:

DETAILED DESCRIPTION

Figure 1:
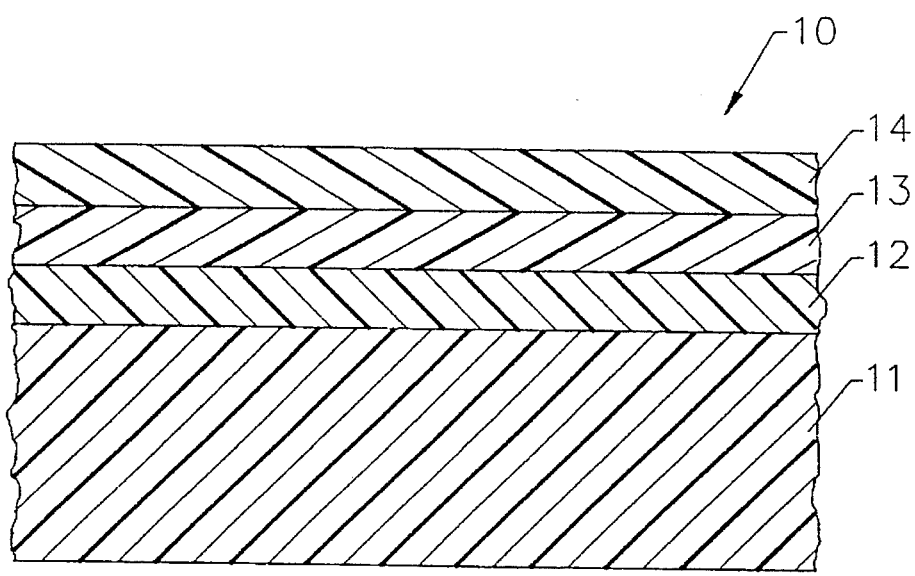
FIG. 1 is a cross-sectional view of the structure of an antifogging polyester according to the present invention.

The present invention is an antifogging plastic lens material that is particularly suitable for use as a disposable fog-resistant lens. FIG. 1 illustrates the invention and in which a lens structure is broadly designated at be. The lens material is formed of a substantially transparent polyester substrate 11, a layer of polyvinylidene chloride-containing polymer 12 on the polyester substrate 11, a water permeable colloid layer 13 on the polyvinylidene chloride-containing layer 12 and a polyvinyl alcohol-containing layer 14 on the water permeable colloid layer.

In preferred embodiments, such as use for lenses in disposal medical goggles or masks, the polyester substrate is between about 4 and 7 mils thick (1 mil=0.001 inch). In commercial embodiments, such polyester substrate material is sometimes sold as a "nominal" 4 mil or 7 mil thickness which may be slightly different from an exact 4 or 7 mil thickness.

The polyvinylidene chloride-containing layer 12 preferably contains at least about 35% by weight polyvinylidene chloride (PVDC). As known to those familiar with such materials, polyvinylidene chloride is the polymer formed from vinylidene chloride or the copolymerization of vinylidene chloride with lesser amounts of other unsaturated compounds. Vinylidene chloride is a colorless liquid having the formula $C_2H_2Cl_2$ in which both hydrogen atoms are replaced by chlorine atoms on one of the carbon atoms in ethylene. The copolymer included with the polyvinylidene chloride, if one is used, can be selected from the group consisting of acrylic polymers, methacrylic polymers, nitryl polymers, itaconic acid (methylene succinic acid) polymers, polyisocyanates, and polyisothiocyanates. In general, the PVDC-containing layer preferably has a thickness of about 1 micron ($\mu$), in other words sufficient to accept the colloid layer 13 and the polyvinylidene chloride layer 14, without any unnecessary excess, and without interfering with the optical or physical properties of the lens.

The water permeable colloid layer 13 preferably comprises gelatin. As generally used in the art, the term "gelatin" refers to a mixture of proteins obtained by hydrolysis of collagen by boiling skin, ligaments, tendons or the like. Type A gelatin is obtained from acid treated raw materials and Type B from alkali treated raw materials. Gelatin is strongly hydrophilic, absorbing up to ten times its weight of water and forming reversible gels of high strength and viscosity. In preferred embodiments of the invention, the gelatin layer has a thickness of about 1$\mu$. As with the other layers, the thickness can be functionally described as being sufficient to provide the bonding function while thin enough to avoid interfering with necessary properties such as flexibility, transparency, and other optical performance parameters. Thicknesses greater than those functionally appropriate are merely an excessive and unnecessary use of the colloid.

The polyvinyl alcohol-containing layer 14 generally further comprises polyvinyl acetate. The presence of polyvinyl acetate along with polyvinyl alcohol is well known to those of ordinary skill in this art and results from the manner in which polyvinyl alcohol is manufactured; i.e. the hydrolysis of polyvinyl acetate to form alcohol functional groups. Stated differently, vinyl alcohol does not occur as a monomer, so that polyvinyl alcohol is generally formed by the hydrolysis of polyvinyl acetate. To the extent that hydrolysis is less than 100% (as is usually the case), the remainder of the polymer is polyvinyl acetate. In preferred embodiments, the polyvinyl alcohol-containing layer has an average molecular weight of between about 11,000 and 110,000 grams per mole and is between about 80% and 99% hydrolyzed. In the most preferred embodiments, the polyvinyl alcohol-containing layer is at least about 87% hydrolyzed.

In the preferred embodiments, the polyvinyl alcohol-containing layer has a thickness of between about 0.1 and 0.5 mils (2.5 and 12.7$\mu$). In general, the polyvinyl alcohol-containing layer can be any appropriate thickness to provide the fog-resistant characteristics, but generally speaking more than about 0.5 mil is excess and offers little or no additional functional value.

In another embodiment, the invention comprises a method of preparing an antifogging plastic material that is particularly suitable for use a disposable fog-resistant lens. In one aspect, the method comprises applying the layer of polyvinyl alcohol-containing polymer to the surface of a polyester substrate that has a polyvinylidene chloride-containing layer on the polyester substrate and a water permeable colloid layer on the polyvinyl chloride-containing layer. In preferred embodiments, the polyvinyl alcohol-containing polymer is applied from an aqueous solution of polyvinyl alcohol.

As stated above, polyvinyl alcohol is generally formed from polyvinyl acetate, thus the method of the invention can further comprise the steps of polymerizing vinyl acetate and thereafter hydrolyzing the resulting polyvinyl acetate to form the polyvinyl alcohol, both prior to the step of applying the polyvinyl alcohol-containing polymer to the polyvinylidene chloride-containing layer on the surface of the polyester substrate. As noted above, when the polyvinyl acetate is so hydrolyzed, the preferred technique is to hydrolyze the polyvinyl acetate to between about 80% and 99% polyvinyl alcohol.

The polyvinyl alcohol-containing polymer can be applied in any appropriate method. Typical methods include roll coating, rotogravure coating, knife over roll coating, and Meyer rod coating. Presently, slot die application is preferred. In such techniques, the polyvinyl alcohol-containing polymer is applied from an aqueous solution at a rate of about 2 pounds per ream of substrate, which corresponds to a thickness of about 0.1 mil (0.0001 inch). The polyvinyl alcohol-containing solution can have a solids content of between about 1% and 20%, and best results appear to be obtained when the solids content of the aqueous solution of polyvinyl alcohol is between about 5% and 10%. Preferably, the aqueous solution also contains a small fraction (e.g. 10%) of a low aliphatic alcohol such as ethyl, methyl, n-propyl, or isopropyl alcohol. The alcohol helps wet out the substrate and prevents fungus from growing in the wet media prior to its application and drying.

Taken on a stepwise basis, the invention further comprises the method of applying a layer of polyvinylidene chloride (PVDC) to the polyester substrate, then applying the layer of water permeable colloid to the PVDC-containing layer, and finally applying a layer of polyvinyl alcohol to the water permeable colloid layer on the PVDC layer.

Specific techniques for preparing polyester films with PVDC and colloid layers thereon are known in the art and are exemplified by U.S. Pat. No. 2,779,684 to Alles, the contents of which are incorporated entirely herein by reference. Additionally, polyester substrates coated with vinylidene chloride are available under the CRONAR trademark from DuPont de Nemours E.I. Co., Wilmington, Del. 19898. In particular, the most satisfactory version of CRONAR found to date is available under the CRONAR-P designation.

EXAMPLE

One hundred fifty grams (150 g) of tap water were placed in a 250 milliliter (ml) beaker and heated to 170° F. Fifteen and one tenth grams (15.1 g) of AIRVOL 203 polyvinyl alcohol (from Air Products and Chemicals, 7201 Hamilton Blvd., Allentown, Pa. 18195) were added with continuous stirring until completely dissolved (about 30 minutes). The solution was allowed to cool to 90° F., after which 21.6 g of isopropyl alcohol were added. This solution was filtered to remove any contamination. The solution was then applied to 0.007 inch thick CRONAR P72 polyester film (from DuPont) by the drawdown method using a #16 Meyer Rod. The coated substrate was then dried in an air oven at 200° F. for two minutes to remove the solvents.

The resulting product exhibited excellent optical clarity, with a haze value of 0.2. In order to confirm its antifog properties, the product was placed coated side down over a beaker containing 100 g of 150° F. water for a period of at least one minute, and did not allow water to cloud or fog its surface.

The adhesion of the coating to the substrate was tested using a Scotch Brand #600 adhesive tape in the Cross hatch tape test described in ASTM B 449. Using this test, the coating could not be removed from the substrate.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A method of preparing an antifogging plastic lens material, said method comprising applying a layer of a polyvinyl alcohol containing-polymer in aqueous solution to the surface of a substrate comprised of a surface layer of a water permeable colloid, a layer of polyvinyl chloride-containing polymer beneath said water permeable colloid layer, and a polyester layer beneath said polyvinylidene chloride-containing layer; and drying the applied layer of polyvinyl alcohol-containing polymer on the said substrate.

2. A method according to claim 1 wherein the step of drying the applied layer of polyvinyl alcohol-containing polymer comprises heating the substrate and applied layer for a time and at a temperature sufficient to dry the polymer while avoiding any detrimental effects on the antifogging characteristics of the resulting lens material.

3. A method according to claim 1 wherein the step of applying the polyvinyl alcohol-containing polymer from an aqueous solution comprises applying the polyvinyl alcohol-containing polymer from an aqueous solution that contains about ten percent of a low aliphatic alcohol.

4. A method according to claim 1 and further comprising the steps of:

polymerizing vinyl acetate; and thereafter hydrolyzing the resulting polyvinyl acetate to form the polyvinyl alcohol-containing polymer, and prior to the step of applying the polyvinyl alcohol containing-polymer to the water permeable colloid layer on the surface of the substrate.

5. A method according to claim 4 wherein the step of hydrolyzing the polyvinyl acetate comprises hydrolyzing the polyvinyl acetate to between about 80 and 99 percent polyvinyl alcohol.

6. A method according to claim 1 in which the step of applying the polyvinyl alcohol-containing polymer is selected from the group consisting of: roll coating, rotogravure, knife over roll, slot die coating, and Meyer rod.

7. A method of preparing an antifogging plastic material that is particularly suitable for use as a disposable fog-resistant lens, said method comprising:

applying a layer of a polyvinylidene chloride-containing polymer by vapor deposition to a polyester substrate;

applying a layer of a water permeable colloid to the polyvinylidene chloride-containing layer; and applying a layer of a polyvinyl alcohol-containing polymer to the water permeable colloid layer on the polyvinylidene chloride-containing layer.

8. A method according to claim 7 wherein the step of applying a layer of a water-permeable colloid comprises applying the layer by vapor deposition.

* * * * *

UNITED STATES PATENT AND TRADEMARK OFFICE
CERTIFICATE OF CORRECTION

PATENT NO. :   5,476,682
DATED      :   December 19, 1995
INVENTOR(S):   Evans

It is certified that error appears in the above-identified patent and that said Letters Patent is hereby corrected as shown below:

Column 2, line 59, "When" should be --when--.

Column 3, line 39, "be." should be --10.--.

Signed and Sealed this

Fourth Day of June, 1996

Attest:

BRUCE LEHMAN

*Attesting Officer*   *Commissioner of Patents and Trademarks*